United States Patent
Pikhletsky et al.

(10) Patent No.: US 9,408,210 B2
(45) Date of Patent: Aug. 2, 2016

(54) METHOD, DEVICE AND SYSTEM FOR DYNAMIC FREQUENCY SPECTRUM OPTIMIZATION

(71) Applicant: Huawei Technologies Co., Ltd., Shenzhen, Guangdong (CN)

(72) Inventors: Mikhail Pikhletsky, Shenzhen (CN); Zezhou Luo, Shenzhen (CN); Hongcheng Zhuang, Shenzhen (CN); Farid Khafizov, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/189,821

(22) Filed: Feb. 25, 2014

(65) Prior Publication Data
US 2014/0179335 A1     Jun. 26, 2014

Related U.S. Application Data

(63) Continuation of application No. PCT/CN2012/080602, filed on Aug. 27, 2012.

(30) Foreign Application Priority Data

Aug. 25, 2011 (CN) .......................... 2011 1 0246547

(51) Int. Cl.
*H04W 72/00* (2009.01)
*H04W 72/04* (2009.01)

(52) U.S. Cl.
CPC .......... *H04W 72/0453* (2013.01); *H04W 72/04* (2013.01)

(58) Field of Classification Search
CPC .......................... H04W 72/0453; H04W 72/04
USPC ........... 455/450, 451, 452.1, 452.2, 453, 454; 370/329
See application file for complete search history.

(56) References Cited

U.S. PATENT DOCUMENTS 5,752,164 A * 5/1998 Jones ............................ 455/454
7,764,967 B2    7/2010 Kim et al.
(Continued)

FOREIGN PATENT DOCUMENTS

CN        1406076 A      3/2003
CN      101132363 A      2/2008
(Continued)

OTHER PUBLICATIONS

Siomina et al., "A Mathematical Framework for Statistical QoS and Capacity Studies in OFDM Networks," IEEE, New York, New York (2009).

(Continued)

*Primary Examiner* — Charles Shedrick
(74) *Attorney, Agent, or Firm* — Leydig, Voit & Mayer, Ltd.

(57) ABSTRACT

The present invention discloses a method, a device and a system for dynamic frequency spectrum optimization. The method includes: predicting a traffic distribution of terminal (s) in each cell of multiple cells; generating multiple frequency spectrum allocation schemes for the multiple cells according to the traffic distribution of the terminal(s) in each cell, wherein each frequency spectrum allocation scheme comprises frequency spectrum(s) allocated for each cell; selecting a frequency spectrum allocation scheme superior to a current frequency spectrum allocation scheme of the multiple cells from the multiple frequency spectrum allocation schemes according to at least two network performance indicators of a network in which the multiple cells are located; and allocating frequency spectrum(s) for the multiple cells using the selected frequency spectrum allocation scheme. The present invention improves the utilization rate of the frequency spectrum and optimizes the multiple network performance indicators at the same time.

18 Claims, 10 Drawing Sheets

(56) References Cited

U.S. PATENT DOCUMENTS

2007/0281710 A1    12/2007  Bai et al.
2010/0202305 A1*    8/2010  Wijting et al. ............... 370/252

FOREIGN PATENT DOCUMENTS

| CN | 101277542 A | 10/2008 |
|---|---|---|
| CN | 101478758 A | 7/2009 |
| CN | 101754381 A | 6/2010 |
| CN | 102045775 A | 5/2011 |
| EP | 1863303 A1 | 12/2007 |
| JP | 2007325260 A | 12/2007 |
| KR | 20110071448 A | 6/2011 |
| RU | 2009131051 A | 2/2011 |
| WO | WO 2010057131 A1 | 5/2010 |

OTHER PUBLICATIONS

Viering et al., "A Mathematical Perspective of Self-Optimizing Wireless Networks," IEEE ICCC 2009 Proceedings, IEEE, New York, New York (2009).

Bernardo et al., "An Application of Reinforcement Learning for Efficient Spectrum Usage in Next-Generation Mobile Cellular Networks," IEEE Transactions on Systems, Man, and Cybernetics—Part C: Applications and Reviews, vol. 40, No. 4, pp. 477-484, IEEE, New York, New York (Jul. 2010).

Majewski et al., "Conservative Cell Load Approximation for Radio Networks with Shannon Channels and its Application to LTE Network Planning," 2010 Sixth Advanced International Conference on Telecommunications, pp. 219-225, IEEE, New York, New York (2010).

Aardal et al., "Models and Solution Techniques for Frequency Assignment Problems," Springer Science+Business Media, LLC (May 12, 2007).

Lopez-Perez et al., "Optimisation Methods for Dynamic Frequency Planning in OFDMA Networks," slides for presentation, Centre for Wireless Network Design (2008).

"Research on Dynamic Spectrum Allocation, Spectrum Access, Resource Optimization Based on Spectrum Characteristics in Cognitive Radio," Beijing University of Posts & Telecommunications (May 10, 2010).

* cited by examiner

METHOD, DEVICE AND SYSTEM FOR DYNAMIC FREQUENCY SPECTRUM OPTIMIZATION

CROSS-REFERENCE TO RELATED APPLICATIONS

This application is a continuation of International Patent Application No. PCT/CN2012/080602, filed on Aug. 27, 2012, which claims priority to Chinese Patent Application No. 201110246547.6, filed on Aug. 25, 2011, both of which are hereby incorporated by reference in their entireties.

FIELD OF TECHNOLOGY

The present invention relates to a field of communication technologies, in particular to a method, a device and a system for dynamic frequency spectrum optimization.

BACKGROUND OF THE INVENTION

In the present frequency spectrum management, frequency spectrum resources are generally allocated in a static frequency spectrum management mode, which is to determine a minimal multiplexing distance of a frequency spectrum, using a traditional frequency spectrum allocation algorithm, according to propagation attenuation and an interference tolerance index, so as to configure an appropriate frequency spectrum for each base station. In order to determine a frequency spectrum multiplexing distance, it is needed to estimate strength of an interference between base stations by calculating the propagation attenuation of a signal, and the minimal multiplexing distance is determined according to a restrictive condition that "an estimation value of an interference strength is not bigger than an interference tolerance". Generally, the estimation value of the interference strength is needed to be added with a specific redundancy, so that the minimal multiplexing distance may suit for more network states, wherein the redundancy is usually determined according to experience. Because the interference tolerance index includes a bigger redundancy, a fixed frequency spectrum multiplexing distance determined by a static plan is longer than an actually required frequency spectrum multiplexing distance at most of the time, causing a decrease of a utilization rate of a frequency spectrum.

With the development of a communication technology, the static frequency spectrum management mode may not meet a requirement. In order to improve the utilization rate of the frequency spectrum, a dynamic frequency spectrum management method is presented to realize dynamic frequency spectrum access. Frequency spectrum widths allocated to different users through the dynamic frequency spectrum access may be changed according to a change of a network state. When a certain user releases its frequency band, other users are permitted to use the frequency band, and a frequency spectrum management device will predict a state of a network load in a next cycle according to a record of a historical network load and newly allocate an idle frequency band to a user in need according to a change of the load, so that the utilization rate of the frequency spectrum is improved.

In a process of realizing the present invention, the inventor discovers that the prior art at least has the following problem: frequent change of the network state may bring frequent reallocation of the frequency spectrum, whereas the frequent reallocation of the frequency spectrum may affect multiple network performance indicators, and some network performance indicators may get worse when the utilization rate of the frequency spectrums is improved.

SUMMARY OF THE INVENTION

In order to improve a utilization efficiency of a frequency spectrum and optimize multiple network performance indicators at the same time, embodiments of the present invention provide a method, a device and a system for dynamic frequency spectrum optimization. Technical solutions are given as follows.

A method for dynamic frequency spectrum optimization, including:
predicting a traffic distribution of terminal(s) in each cell of multiple cells;
generating multiple frequency spectrum allocation schemes for the multiple cells according to the traffic distribution of the terminal(s) in each cell, wherein each frequency spectrum allocation scheme comprises frequency spectrum(s) allocated for each cell;
selecting a frequency spectrum allocation scheme superior to a current frequency spectrum allocation scheme of the multiple cells from the multiple frequency spectrum allocation schemes according to at least two network performance indicators of a network in which the multiple cells are located; and
allocating frequency spectrum(s) for the multiple cells using the selected frequency spectrum allocation scheme.

A device for dynamic frequency spectrum optimization, including:
a predicting module, configured to predict a traffic distribution of terminal(s) in each cell of multiple cells;
a generating module, configured to generate multiple frequency spectrum allocation schemes for the multiple cells according to the traffic distribution of the terminal(s) in each cell, wherein each frequency spectrum allocation scheme comprises frequency spectrum(s) allocated for each cell;
an optimizing module, configured to select a frequency spectrum allocation scheme superior to a current frequency spectrum allocation scheme of the multiple cells from the multiple frequency spectrum allocation schemes according to at least two network performance indicators of a network in which the multiple cells are located; and
an allocating module, configured to allocate frequency spectrum(s) for the multiple cells using the selected frequency spectrum allocation scheme.

A system for dynamic frequency spectrum optimization, including:
the device for dynamic frequency spectrum optimization and base stations to which the multiple cells belong;
wherein the base stations are configured to receive frequency spectrum(s) allocated for the multiple cells by the device for dynamic frequency spectrum optimization.

Beneficial effects brought by the technical solutions provided by the embodiments of the present invention are:
the utilization rate of the frequency spectrum is improved by predicting the traffic distribution of the terminal(s), obtaining the multiple frequency spectrum allocation schemes according to the traffic distribution and dynamically performing management of frequency spectrum allocation; and multiple network performance indicators are optimized at the same time by selecting the frequency spectrum allocation scheme superior to the current frequency spectrum allocation scheme from the multiple frequency spectrum allocation schemes according to the multiple network performance indicators.

BRIEF DESCRIPTION OF THE DRAWINGS

To illustrate technical solutions in the embodiments of the present invention more clearly, a brief introduction on the accompanying drawings which are needed in the description of the embodiments is given below. Apparently, the accompanying drawings in the description below are merely some of the embodiments of the present invention, based on which other drawings can be obtained by the persons of ordinary skill in the art without any creative effort.

DETAILED DESCRIPTION OF THE EMBODIMENTS

To make objectives, technical solutions and advantages of the present invention clearer, a further and detailed description of embodiments of the present invention will be given below, in combination with the accompanying drawings.

Embodiment 1

Figure 1:
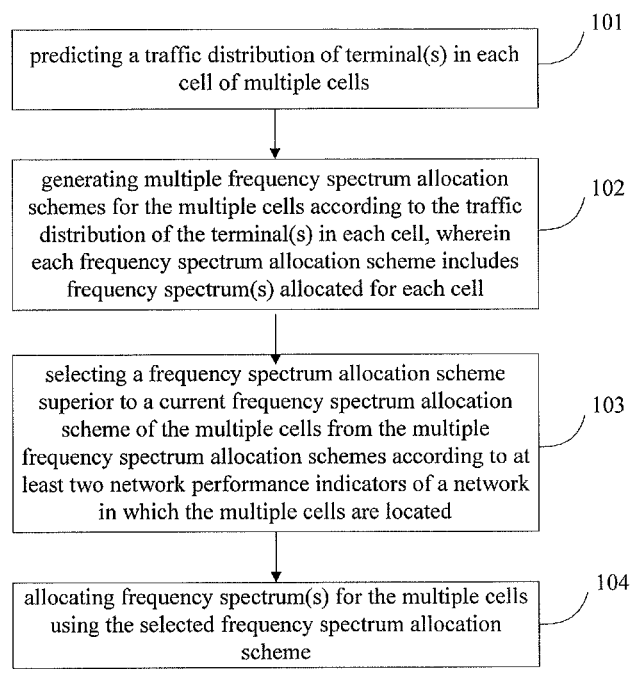
FIG. 1 is a flowchart of a method for dynamic frequency spectrum optimization provided by embodiment 1 of the present invention.

As shown in FIG. 1, an embodiment of the present invention provides a method for dynamic frequency spectrum optimization, including the following steps.

101: predicting a traffic distribution of terminal(s) in each cell of multiple cells.

In this step, the traffic distribution may be predicted in multiple methods such as a Holt-Winters method and a prediction method based on a historical traffic distribution. The present invention does not limit the methods used for predicting the traffic distribution of the terminal(s). Those skilled in the art may also predict the traffic distribution according to another method capable of being used for predicting a traffic distribution of user(s), which is not limited by the present invention.

102: generating multiple frequency spectrum allocation schemes for the multiple cells according to the traffic distribution of the terminal(s) in each cell, wherein each frequency spectrum allocation scheme includes frequency spectrum(s) allocated for each cell.

In this step, a predictive load of each cell is calculated according to the traffic distribution of the terminal(s) in each cell, and frequency spectrums are allocated for each cell according to the predictive load.

103: selecting a frequency spectrum allocation scheme superior to a current frequency spectrum allocation scheme of the multiple cells from the multiple frequency spectrum allocation schemes according to at least two network performance indicators of a network in which the multiple cells are located.

In this step, it is considered that network performance may be affected when the frequency spectrum allocation scheme is inappropriate. In the step 102, the multiple frequency spectrum allocation schemes are generated according to the predicted traffic distribution of the terminals included in the multiple cells. Because a frequency spectrum may be multiplexed, a frequency spectrum allocated for each cell may be selected, and the generated frequency spectrum allocation schemes are also different. Difference of the frequency spectrum allocation schemes may affect the network performance. If it is needed to consider multiple network performance indicators in a network operation, it is needed to consider to optimize the multiple network performance indicators at the same time, and to select a frequency spectrum allocation scheme superior to the current frequency spectrum allocation scheme from the multiple frequency spectrum allocation schemes according to the multiple network performance indicators.

104: allocating frequency spectrum(s) for the multiple cells using the selected frequency spectrum allocation scheme.

In this step, after the scheme superior to the current frequency spectrum scheme is selected according to the multiple network performance indicators, frequency spectrum allocation is performed using the selected frequency spectrum allocation scheme.

Furthermore, before the predicting a traffic distribution of terminal(s) in each cell of multiple cells, the method further includes:

determining whether the current frequency spectrum allocation scheme of the multiple cells is suitable for a traffic distribution of terminal(s); if not, predicting the traffic of the terminal(s) in each cell of the multiple cells.

When a frequency spectrum allocation scheme does not accord with the traffic distribution of the terminal(s), the network performance will be affected. Therefore, it is needed in this step to determine whether current frequency spectrum allocation is suitable for the traffic distribution of the terminal(s) and if not, to predict the traffic of the terminal(s) in each cell of the multiple cells.

Further, the determining whether the current frequency spectrum allocation scheme of the multiple cells is suitable for a traffic distribution of terminal(s) includes: acquiring an average frequency spectrum efficiency of the network in which the multiple cells are located, and determining that the current frequency spectrum allocation scheme of the multiple cells is not suitable for the traffic distribution of the terminal(s) if the average frequency spectrum efficiency is smaller than a preset frequency spectrum efficiency threshold;

or, acquiring an average load of the network in which the multiple cells are located, and determining that the current frequency spectrum allocation scheme of the multiple cells is not suitable for the traffic distribution of the terminal(s) if the average load is bigger than a preset load threshold.

The method of the embodiment of the present invention, by predicting the traffic distribution of the terminal(s) in each cell and generating the multiple frequency spectrum allocation schemes, performs a dynamic frequency spectrum management process and improves the utilization rate of the frequency spectrum; and, by considering the multiple network performance indicators at the same time and selecting an optimized frequency spectrum allocation scheme according to the multiple network performance indicators, optimizes the multiple network performance indicators at the same time.

Embodiment 2

Figure 2:
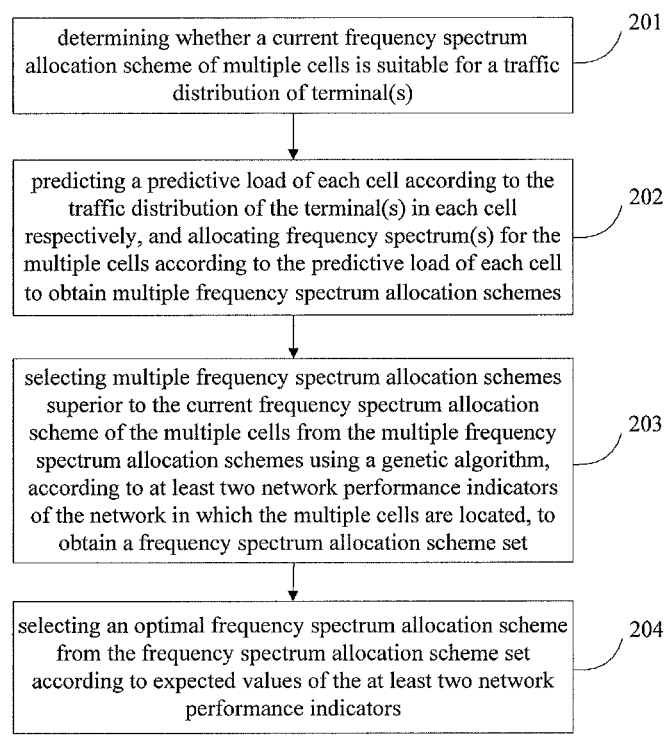
FIG. 2 is a flowchart of a method for dynamic frequency spectrum optimization provided by embodiment 2 of the present invention.

As shown in FIG. 2, an embodiment of the present invention provides a method for dynamic frequency spectrum optimization, including the following steps.

201: determining whether a current frequency spectrum allocation scheme of multiple cells is suitable for a traffic distribution of terminal(s).

An average frequency spectrum efficiency and an average load are the most basic indicators of network performance. If one of the average frequency spectrum efficiency and the average load does not meet a specific value, it is indicated that the current frequency spectrum allocation scheme does not match with the traffic distribution of the terminal(s), and it is needed to reallocate frequency spectrums.

This step includes: determining that the current frequency spectrum allocation scheme of the multiple cells is not suitable for the traffic distribution of the terminal(s), according to the acquired average frequency spectrum efficiency of the network in which the multiple cells are located, if it is determined that the average frequency spectrum efficiency is smaller than a preset frequency spectrum efficiency threshold;

or, determining that the current frequency spectrum allocation scheme of the multiple cells is not suitable for the traffic distribution of the terminal(s), according to the acquired average load of the network in which the multiple cells are located, if it is determined that the average load is bigger than a preset load threshold.

Specifically, a real-time average load or average frequency spectrum efficiency of the network in which the multiple cells are located may be obtained by continuously measuring and calculating according to a parameter configuration in the network side in the current frequency spectrum allocation scheme. After the real-time average frequency spectrum efficiency or average load is acquired, it is performed to determine whether the real-time average frequency spectrum efficiency is smaller than the preset frequency spectrum efficiency threshold or whether the average load is bigger than the preset load threshold, wherein the frequency spectrum efficiency threshold and the load threshold are decided according to specific network requirements.

If it is determined that the average frequency spectrum efficiency is really smaller than the preset frequency spectrum efficiency threshold or the average load is really bigger than the preset load threshold, the current frequency spectrum allocation scheme is not suitable for the traffic distribution of the terminal(s), and it is needed to predict the traffic distribution of the terminal(s) in each cell of the multiple cells to newly generate frequency spectrum allocation schemes.

If it is not determined that the average frequency spectrum efficiency is not smaller than the preset frequency spectrum efficiency threshold or the average load is not bigger than the preset load threshold, it is continued to measure and calculate to obtain the real-time average load or average frequency spectrum efficiency.

202: predicting a predictive load of each cell according to the traffic distribution of the terminal(s) in each cell respectively, and allocating frequency spectrum(s) for the multiple cells according to the predictive load of each cell to obtain multiple frequency spectrum allocation schemes.

In this step, for the traffic distribution of the terminal(s) in each cell, it is needed to continuously collect traffic information of each terminal in the cell, This is because service habits and movement of a terminal user cause a change of the traffic, and it is usually random that a single terminal user initiates a data transmission or moves to a certain position but a long-time statistic based on a large quantity of terminal users has obvious regularity, such as commuting routes in working days, a large traffic in business districts in daytime and a large traffic in residential districts at night, etc.

After the traffic information of each terminal in the cell is collected, the traffic distribution is predicted in a Holt-Winters method, and the predictive load of each cell is predicted according to the traffic distribution of the terminal(s) in each cell respectively.

$x_1, \ldots, x_t$ express a time sequence with a cycled, and the Holt-Winters method for predicting a value $\hat{x}_{t+h}$ of the sequence after h time according to a current recorded sequence is:

$$L_t = \zeta \cdot (x_t - I_{t-d}) + (1-\zeta) \cdot L_{t-1},$$

$$I_t = \delta \cdot (x_t - L_t) + (1-\delta) \cdot I_{t-d},$$

$$\hat{x}_{t+h} = L_t + I_{t-d+h \bmod d}, \quad (1)$$

wherein $L_t$ is a part of an average value of a traffic, $I_t$ is a part of a cyclic change value part of the traffic, the predictive value is acquired after a cyclicality of the sequence is observed, and $0 \leq \zeta \leq 1$ and $0 \leq \delta \leq 1$ are parameters for controlling a smoothness degree.

Figure 3:
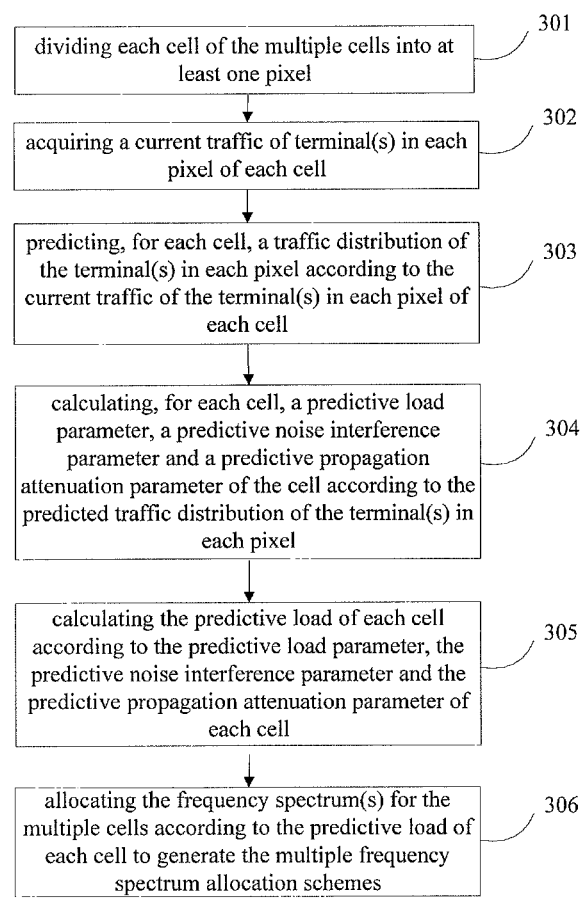
FIG. 3 is a flowchart of obtaining multiple frequency spectrum allocation schemes provided by embodiment 2 of the present invention.

Specifically, as shown in FIG. 3, the step 202 in this embodiment includes steps 301-306.

301: dividing each cell of the multiple cells into at least one pixel.

In this step, the range of each cell in the multiple cells included in a network is divided into several pixels, which are generally regular pixels, such as squares.

302: acquiring a current traffic of terminal(s) in each pixel of each cell.

In this step, the pixel is used as a unit for measuring and recording the traffic.

303: predicting, for each cell, a traffic distribution of the terminal(s) in each pixel according to the current traffic of the terminal(s) in each pixel of each cell.

In this step, the recorded traffic of each pixel is counted and predicted in the Holt-Winters method, namely formula (1), to obtain a traffic distribution rule in each pixel. The traffic is counted and predicted in a cycle of 1 hour. The cycle for counting and predicting the traffic usually depends on a cycle in which the traffic changes. Generally, the traffic has different distributions at different time periods of every day, so hour-level counting and predicting are appropriate, and the counting and predicting cycle is relatively longer than a scheduling cycle (a scheduling cycle of accessing to network resources).

304: calculating, for each cell, a predictive load parameter, a predictive noise interference parameter and a predictive propagation attenuation parameter of the cell according to the predicted traffic distribution of the terminal(s) in each pixel.

In this step, three parameters $\hat{G}_c$, $\hat{N}_c$, and $\hat{H}_{c,d}$ are introduced for the cell to predict the load of each cell, and the parameters $\hat{G}_c$, $\hat{N}_c$, and $\hat{H}_{c,d}$ express the predictive load parameter, the predictive noise interference parameter and the predictive propagation attenuation parameter respectively.

$$G_c = \sum_{s \in S} \sum_{p \in P_c} \frac{T_{s,p} \cdot D_s}{W_{b_c} \cdot k_c^{sch} \cdot \eta^{BW}} \qquad (2)$$

$$N_c = \sum_{s \in S} \sum_{p \in P_c} \frac{T_{s,p} \cdot \eta^{SINR} \cdot D_s \cdot P^n}{W_{b_c} \cdot k_c^{sch} \cdot \eta^{BW} \cdot P_c \cdot g_{c,p}} \qquad (3)$$

$$H_{c,d} = \sum_{s \in S} \sum_{p \in P_c} \frac{T_{s,p} \cdot \eta^{SINR} \cdot D_s \cdot P_d \cdot g_{d,p}}{W_{b_c} \cdot k_c^{sch} \cdot \eta^{BW} \cdot P_c \cdot g_{c,p}} \qquad (4)$$

$T_{s,p}$ is the number of users belonging to service s in the $p^{th}$ pixel of the $c^{th}$ cell, and expresses the traffic distribution in the $p^{th}$ pixel.

305: calculating the predictive load of each cell according to the predictive load parameter, the predictive noise interference parameter and the predictive propagation attenuation parameter of each cell.

The predictive load of the cell c may be obtained according to formulae (2)-(4) in this step:

$$\hat{\rho}_c = G_c \cdot f\left(\frac{N_c}{G_c} + \sum_{d \in I_c} \frac{H_{c,d} \cdot \min(\hat{\rho}_d, 1)}{G_c}\right), \qquad (5)$$

$$c = 1, \ldots, C.$$

wherein function $$f(x) = \frac{\log(2)}{\ln(1 + 1/x)}.$$

The predictive load of the cell may also be calculated in another method, which is given as follows specifically.

It is supposed that in a network, $\mathcal{M} := \{1, \ldots, M\}$ expresses a terminal set, $S := \{1, \ldots, S\}$ expresses a service set, $C := \{1, \ldots, C\}$ expresses a cell set, $B := \{1, \ldots, B\}$ expresses a frequency band set, frequency band $b_c \in B$ is allocated to a certain cell $c \in C$, the width of the frequency band is $W_{b_c}$, and a corresponding interference cell set is $I_c = \{d \in C = b_d = b_c, d \neq c\}$. Service class $s \in S$ corresponds to a bandwidth requirement $D_s$ belonging to a service s, and $s_m \in S$ corresponds to a bandwidth requirement $D_{s_m}$ of a certain terminal $m \in \mathcal{M}$. The load of cells is expressed as a vector $\rho = (\rho_1, \ldots, \rho_c)$. The number of terminals in the cell c is expressed as $\mathcal{M}_c \subset \mathcal{M} = M_c = |\mathcal{M}_c|$. The network is divided into multiple pixels: $\mathcal{P} := \{1, \ldots, P\}$, $\mathcal{P}_c \subset \mathcal{P}$ represents a set of pixels of the $c^{th}$ cell. A signal to interference and noise ratio (SINR) of the $m^{th}$ terminal is expressed as:

$$\gamma_m(\rho) = \frac{P_c \cdot g_{c,m}}{P^n + \sum_{d \in I_c} \rho_d \cdot P_d \cdot g_{d,m}} \qquad (6)$$

wherein $P_d$ expresses a transmitting power of each PRB (Physical Resource Block), $g_{d,m}$ expresses a channel gain from the $d^{th}$ cell to the $m^{th}$ terminal, and $P^n$ expresses a noise power. According to a Shannon formula, the bandwidth per hertz of the $m^{th}$ terminal is:

$$R_m(\rho) = k_c^{sch} \cdot \eta^{BW} \cdot \log_2(1 + \gamma_m(\rho)/\eta^{SINR}) \qquad (7)$$

wherein $k_c^{sch}$ is a scheduling gain of the user terminal m in the cell c, $\eta^{BW}$ and $\eta^{SINR}$ are model correction parameters. Because formula (7) is an approximate expression, the two parameters are introduced after actual measurement to correct approximate errors. According to formula (7), the bandwidth required to be allocated to the $m^{th}$ user terminal by the $c^{th}$ cell is:

$$W_m(\rho) = \frac{D_{s_m}}{R_m(\rho)} \qquad (8)$$

thus, a predictive load $\hat{\rho}_c$ and a real load $\rho_c$ of the $c^{th}$ cell may be calculated as follows:

$$\hat{\rho}_c(\rho) = \frac{\sum_{m \in M_c} W_m(\rho)}{W_{b_c}} \qquad (9)$$

$$\rho_c = \min(\hat{\rho}_c, 1) \qquad (10)$$

The predictive load may be calculated in this method, but it is needed to measure a large quantity of data (a position and a SINR of each terminal) to directly calculate formulae (9) and (10), and the calculation quantity is large.

306: allocating the frequency spectrum(s) for the multiple cells according to the predictive load of each cell to generate the multiple frequency spectrum allocation schemes.

In the condition that the predictive load of each cell is determined, due to multiplexing of a frequency spectrum, a few kinds of frequency spectrums may be allocated to the cell, and the multiple cells may have multiple allocation modes, so the multiple frequency spectrum allocation schemes are obtained.

203: selecting multiple frequency spectrum allocation schemes superior to the current frequency spectrum allocation scheme of the multiple cells from the multiple frequency spectrum allocation schemes using a genetic algorithm, according to at least two network performance indicators of the network in which the multiple cells are located, to obtain a frequency spectrum allocation scheme set.

A network performance indicator is an indicator for evaluating network performance after a network is established, such as a call drop and block rate and a service interruption or delay rate. Multiple network performance indicators affect the network performance after a frequency spectrum allocation scheme is changed. In order to optimize the multiple network performance indicators at the same time, a method of traversing all the frequency spectrum allocation schemes may be used usually, but the efficiency of this simple traversing method is too low. An embodiment of the present invention provides a method for selecting a set of optimized frequency spectrum schemes superior to the current frequency spectrum allocation scheme from the obtained multiple frequency spectrum allocation schemes using the genetic algorithm.

Multiple network performance indicators have a compromise relation at most of the time. For example, because inappropriate frequency spectrum allocation or insufficiency of frequency spectrum resources easily causes call drop or block, it is needed to change the frequency spectrum allocation to optimize the call drop and block rate; but a dynamic frequency spectrum management process of changing frequency spectrum allocation on frequency spectrums of some cells is performed too frequently, services running in these cells may be affected (interrupted or delayed); considering from feeling of users, the service interruption or delay rate is needed to be controlled within a reasonable range, thus the call drop and block rate (CDBR) and the service interruption or delay rate (SI) have the compromise relation.

When multiple network performance indicators with the compromise relation are being optimized, it is needed to determine an optimal compromise point among the multiple network performance indicators with the compromise relation, and to find a corresponding relation between all the network performance indicators with the compromise relation as much as possible. Therefore, the present embodiment provides a Pareto Front set, in which frequency spectrum allocation schemes are all optimized frequency spectrum allocation schemes, and are not distinguished in advantages and disadvantages for the multiple network performance indicators with the compromise relation (for example, in frequency spectrum allocation scheme 1, the CDBR indicator is slightly higher, and the SI indicator is slightly lower; in frequency spectrum allocation scheme 2, the CDBR indicator is slightly lower, and the SI indicator is slightly higher; and influences of the frequency spectrum allocation scheme 1 and the frequency spectrum allocation scheme 2 on the network performance are equivalent). The Pareto Front set may be used for describing the corresponding relation of the multiple network performance indicators with the compromise relation, and the set is determined using the genetic algorithm.

Figure 4:
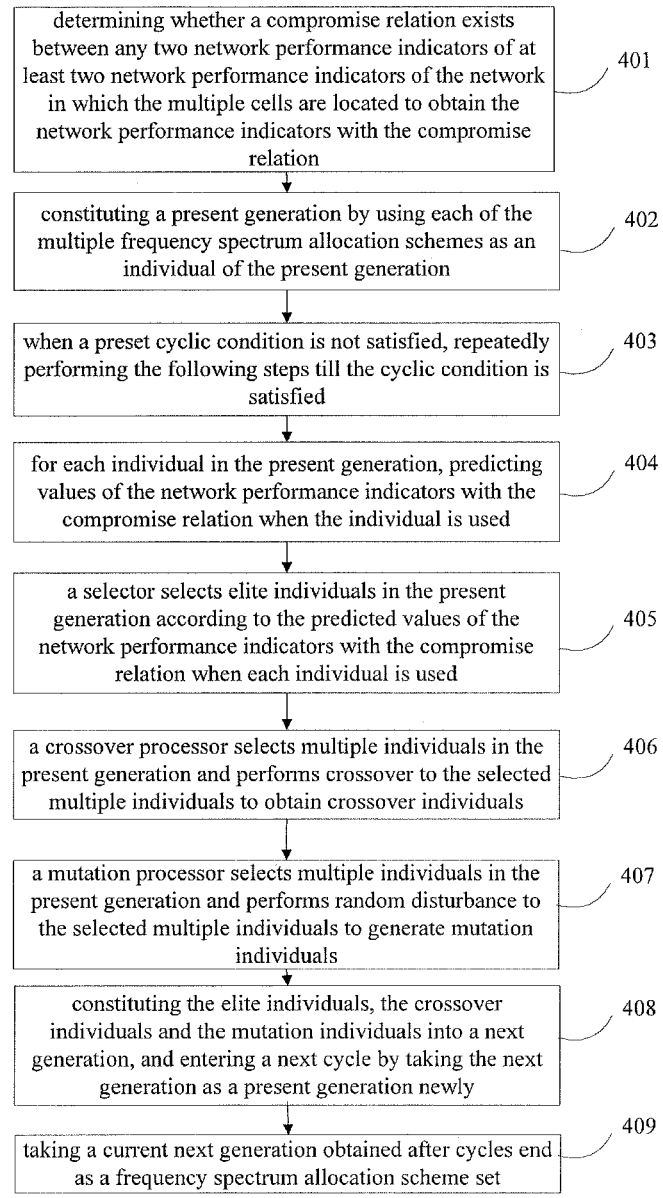
FIG. 4 is a flowchart of obtaining a frequency spectrum allocation scheme set corresponding to multiple network performance indicators with a compromise relation provided by embodiment 2 of the present invention.

As shown in FIG. 4, determining the Pareto Front set using the genetic algorithm includes steps 401-409.

401: determining whether a compromise relation exists between any two network performance indicators of at least two network performance indicators of the network in which the multiple cells are located to obtain the network performance indicators with the compromise relation.

At least two network performance indicators needed to be improved are preset in the present embodiment. The CDBR and the SI are taken as an example for illustration in the present embodiment, but which network performance indicators (KPIs) are preset or their definitions are not limited. Other network performance indicators (KPIs) may be preset according to a requirement of the network, which all apply to the method of the present invention. Multiple network performance indicators with the compromise relation may be found according to existing experience or physical definitions of network performance indicators (KPIs).

A definition of the call drop and block rate (CDBR) network performance indicator (KPI) is expressed as:

$$f_{CDBR}(\rho, M) = \frac{\sum_{c \in C} \max\left(\left(1 - \frac{1}{\rho_c}\right) \cdot M_c, 0\right)}{\sum_{c \in C} M_c} \quad (11)$$

A definition of the service interruption (SI) network performance indicator is shown in formula (12). The definition of the SI may also include a more complex parameter, such as a service QoS parameter.

$$f_{SI}(b, b^{pre}, M) = \frac{\sum_{c \in C} (b_c \neq b_c^{pre}) \cdot M_c}{\sum_{c \in C} M_c} \quad (12)$$

$b_c^{pre}$ expresses a previous frequency spectrum configuration of a cell, and b expresses a current frequency spectrum configuration.

402: constituting a present generation by using each of the multiple frequency spectrum allocation schemes as an individual of the present generation.

403: when a preset cyclic condition is not satisfied, repeatedly performing the following steps till the cyclic condition is satisfied.

The preset cyclic condition is that a preset time is up or an error exceeds a preset error, or may be another end condition, which is set according to a requirement, and the preset cyclic condition is not limited in the embodiment of the present invention.

404: for each individual in the present generation, predicting values of the network performance indicators with the compromise relation when the individual is used.

405: a selector selects elite individuals in the present generation according to the predicted values of the network performance indicators with the compromise relation when each individual is used.

406: a crossover processor selects multiple individuals in the present generation and performs crossover to the selected multiple individuals to obtain crossover individuals.

407: a mutation processor selects multiple individuals in the present generation and performs random disturbance to the selected multiple individuals to generate mutation individuals.

408: constituting the elite individuals, the crossover individuals and the mutation individuals into a next generation, and entering a next cycle by taking the next generation as a present generation newly.

409: taking a current next generation obtained after cycles end as a frequency spectrum allocation scheme set.

A pseudo code list for specifically performing the genetic algorithm using formulae (11) and (12) as definitions of the network performance indicators in the present embodiment is shown in table 1. A pseudo code list of a crossover function (Crossover) is shown in table 2. A pseudo code list of a mutation function (Mutation) is shown in table 3.

TABLE 1

Algorithm 1. NSGA-II

Input: parameters G, N and H corresponding to formulae (2)-(4) obtained according to prediction
Output: a set of frequency spectrum allocation schemes included in Pareto Front
1: Initialize( $P_0$ )
// randomly initializing individuals of a primary generation
2: Evaluate( $P_0$ )
// calculating fitness of the individuals of the primary generation
3: NondominanceDepthRanking( $P_0$ )
// ranking the individuals of the primary generation
4: CrowdingDistance( $P_0$ )
// calculating crowding distances of the individuals of the primary generation
5: $P_0' $ = Selection( $P_0$ )
// randomly selecting individuals of the primary generation for inheritance according to ranks and crowding distances of the individuals of the primary generation
6: $P_0^{xover}$ = Crossover( $P_0'$ )
7: $P_0^{mutation}$ = Mutation( $P_0'$ )
8: $Q_0 = [P_0^{xover} \quad P_0^{mutation}]$
// newly generated individuals of the primary generation consist of crossover individuals and mutation individuals
9: t = 0
10: while Termination( $P_t, Q_t$ )
// Termination serving as a determining function for ending the genetic algorithm depends on limit of a specific application, such as a time and an error
11:   $R_t = [P_t \quad Q_t]$
// whole of the primary generation
12:   NondominanceDepthRanking( $R_t$ )
// ranking the individuals of the primary generation
13:   $P_{t+1}$ = SelectBetterHalf( $R_t$ )
// selecting a better half for genetic operation from the individuals of the current generation according to the ranks and the crowding distances
14:   $P_{t+1}'$ = Selection( $P_{t+1}$ )
// randomly selecting half of the individuals from $P_{t+1}$
15:   $P_{t+1}^{xover}$ = Crossover( $P_{t+1}'$ )
// performing crossover to the individuals in $P_{t+1}'$
16:   $P_{t+1}^{mutation}$ = Mutation( $P_{t+1}'$ )
// performing mutation to the individuals in $P_{t+1}'$
17:   $Q_{t+1} = [P_{t+1}^{xover} \quad P_{t+1}^{mutation}]$
// a next generation consists of $P_{t+1}^{xover}$ and $P_{t+1}^{mutation}$
18:   t = t + 1
19: end 20: return NondominatedSolutions( $P_t, Q_t$ )   // returning to the Pareto Front set

TABLE 2

Algorithm 2. Load-based crossover

Input: parent generation frequency spectrum allocation schemes
$b' = (b_1', \ldots, b_c')$, $b'' = (b_1'', \ldots, b_c'')$ and corresponding loads
$\rho' = (\rho_1', \ldots, \rho_c')$, $\rho = (\rho_1'', \ldots, \rho_c'')$, H
obtained according to formula (4) and an average number of neighboring individuals $\alpha$
Output: a next generation frequency spectrum allocation scheme
$b = (b_1, \ldots, b_c)$
generated through crossover
1: $d: \rho_d' - \rho_d'' = \min(\rho_1' - \rho_1'', \ldots, \rho_c' - \rho_c'')$
// finding out a cell d with proximate load performance in the two frequency spectrum allocation schemes b' and b''
2: b = b''
3: $b_d = b_d'$
// an offspring generation individual b inherits frequency spectrum allocation from the parent generation individual b' except the frequency spectrum allocation of the cell d, and inherits frequency spectrum(s) of the cell d from the parent generation individual b''
4: K = max(min($\alpha$ + randn,C),1)
// the offspring generation individual inherits frequency spectrums of K cells around the cell d from parent generation b', and generally K is a random variable of which the average value is $\alpha$
5: $N_d \subset C : |N_d| = K, H_{d,n} \cdot \min(\hat{\rho}_n, 1) \geq H_{d,m} \cdot \min(\hat{\rho}_m, 1), \forall n \in N_d, \forall m \in C \setminus \{N_d\}$
// determining K neighboring cells with the biggest interference to the cell d
6: for             n = $N_d$
7:             $b_n = b_n'$
8: end
9: return b

TABLE 3

Algorithm 3. Hybrid mutation

Input: a parent generation frequency spectrum allocation scheme
$b' = (b_1', \ldots, b_c')$ and a corresponding load $(\rho_1', \ldots, \rho_c')$, Fitness function, a ratio of cells with mutation $0 \leq \beta \leq 1$ and a local search parameter
$0 \leq \gamma \leq 1$
Output: an offspring generation frequency spectrum allocation scheme
$b = (b_1, \ldots, b_c)$
1: if $\gamma$+rand > 1
// if the condition is satisfied, performing local search
2:       b = b'
// initializing an offspring generation individual using a parent generation individual
3:       $s_1, \ldots, s_c$ = sort $(\rho_1', \ldots, \rho_c')$
// ranking all cells according to the load from big to small
4:       for c = $s_1, \ldots, s_c$
// traversing from a cell with the biggest load
5:             for $b_c$ = 1, ..., B
6:                   $f_{b_c}$ = Fitness(b)
// traversing all frequency bands for the cell c
7:             end
8:             $b_c : f_{b_c}$ = min($f_1, \ldots, f_B$)
// endowing the cell c with a frequency spectrum with the optimal fitness
9:       end
10: else
// random mutation
11:       for c = 1, ..., C
12:             if rand > $\beta$
13:                   $b_c$ = randi(B)
14:             end TABLE 3-continued Algorithm 3. Hybrid mutation 15:     end
16: end
17: return b

204: selecting an optimal frequency spectrum allocation scheme from the frequency spectrum allocation scheme set according to expected values of the at least two network performance indicators.

After the optimized frequency spectrum allocation scheme set corresponding to all the network performance indicators with the compromise relation is acquired, all the frequency spectrum allocation schemes in the set are superior to the current frequency spectrum allocation scheme. When limit of an actual application is considered, the optimal allocation scheme may be finally determined. In this step, the preset expected values of the at least two network performance indicators are taken as a reference point, and for each frequency spectrum allocation scheme in the frequency spectrum allocation scheme set, predictive values of the at least two network performance indicators when the frequency spectrum allocation scheme is used are predicted. The present embodiment performs calculation in a reference point method to find out a frequency spectrum allocation scheme making the distance between the predictive values of the network performance indicators and the reference point that the expected values of the network performance indicators are used as the shortest; and selects the frequency spectrum allocation scheme corresponding to the predictive values of the network performance indicators having the shortest distance with the reference point as the optimal frequency spectrum allocation scheme. Specifically, the reference point method is based on the expected values of the network performance indicators (KPIs) of an operator. For example, for two KPIs, CDBR defined by formula (11) and SI defined by formula (12), the operator generally have expected values according to experience and a requirement of ensuring the quality of service of the network. Typically, $z_{CDBR}=0$ and $z_{SI}=0$, and $z=(z_{CDBR},z_{SI})$ is used as the reference point of the values of the network performance indicators (KPIs). In the presence of more than two KPIs, $z=(z_1, z_2, z_3 \ldots)$ is obtained as the reference point of the values of the network performance indicators (KPIs) according to expected values of the more than two network performance indicators (KPIs).

In an embodiment of the present invention, the constraint between the reference point and the expected frequency spectrum allocation scheme is realized through formula (13) using the reference point method.

$$\min \max_{i=1,\ldots,k}[w_i(f_i(x)-z_i)]$$

$$s.t. x \in S \quad (13)$$

x expresses a frequency spectrum allocation scheme, f(x) expresses the predictive values of the network performance indicators predicted by the frequency spectrum allocation scheme, and S expresses frequency spectrum allocation schemes in the Pareto Front set.

Formula (13) converts a multi-target optimization problem into a single-target optimization problem depending on the reference point.

If only two network performance indicators (CDBR and SI) are considered, the problem of formula (13) is equivalent to $w_{CDBR}(f_{CDBR}(x)-z_{CDBR})=w_{SI}(f_{SI}(x)-z_{SI})$. On a plane $(f_{CDBR}(x),f_{SI}(x))$ using the network performance indicator CDBR as a horizontal axis and using the network performance indicator SI as a longitudinal axis, the optimization problem is a straight line passing through a reference point $(z_{CDBR},z_{SI})$, of which the slope is determined by $(w_{CDBR},w_{SI})$ wherein $(w_{CDBR},w_{SI})$ is weight values of the network performance indicators and is determined according to the expected values of the network performance indicators. In an embodiment of the present invention, the expected values of the network performance indicators are equal and weights are also equal, so the slope is 1. According to a crossing point of the straight line and the predictive values of the network performance indicators predicted by the frequency spectrum allocation schemes in the Pareto Front set, the optimal solution of the optimization problem described by problem (13) may be determined, which is referred to the point in a circle in FIG. 7, namely the optimal frequency spectrum allocation scheme obtained according to formula (13) and the expected values of the network performance indicators. Frequency spectrum allocation is performed using the optimal frequency spectrum allocation scheme. When three network performance indicators (KPIs) are considered, the problem of formula (13) is equivalent to solving the maximized minimum of formula (13) when k is equal to 3, and the solution may be performed using an existing mathematical method.

Selecting the optimal frequency spectrum allocation scheme may also be solved in other methods. Referring to a fitting curve in FIG. 7, the optimal solution is obtained using a weight sum method, taking a curve as an approximate curve of the predictive values of the network performance indicators predicted by the frequency spectrum allocation schemes in the Pareto Front set. All points on the curve in FIG. 7 may be used as values of the optimal points, and are frequency spectrum allocation schemes optimizing the network performance in comparison with the current frequency spectrum allocation scheme. However, apparently, the network performances among these points are greatly different, for example, the point in a rhombus on the curve of FIG. 7, positioned on the lower right corner of the curve, has a big difference in the values of the network performance indicators from points on the upper left corner of the curve, and the big difference between the values of the network performance indicators at different time may cause instability of the network performance.

Figure 5:
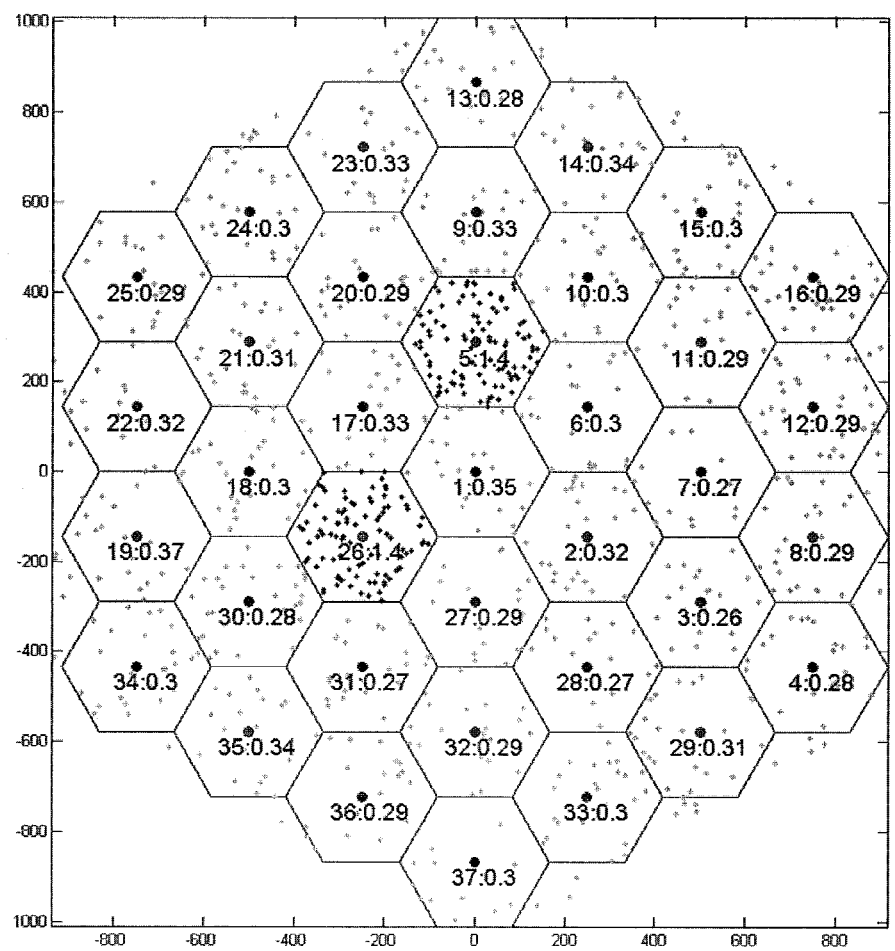
FIG. 5 is a schematic diagram of a network state provided by embodiment 2 of the present invention.

As shown in FIG. 5, considering a network consisting of 37 cells actually, cell 5 and cell 26 are heavy-load cells of which the average user number is 100, the other cells are non heavy-load cells of which the average user number is 20, and all users use 512 k constant rate services. The network initially allocates frequency spectrums in a mode of multiplexing 3 (namely, 3 frequency spectrums may be multiplexed), and the virtual load of a cell is marked beside the sequence number of the cell in the condition of frequency spectrum multiplexing 3. The virtual load is a load requested by a user; and when the virtual load is bigger than 1, it is indicated that the cell is overloaded. For example, the virtual loads of both the cell 5 and the cell 26 shown in FIG. 5 are 1.4, thus the cell 5 and the cell 26 are overloaded cells and may occur serious call drop and block; and it is determined that the average frequency spectrum efficiency and the average load of the cell 5 and the cell 26 do not match with the traffic distribution of the terminals in the network, and it is needed to reallocate the frequency spectrums.

By collecting the traffic information of terminal users, change rules of the traffic of the terminal users are obtained as follows: the terminal users are mainly centralized in cells 18, 20, 7 and 28 at 0 am-8 am every day; the terminal users gradually move from these cells to cells 30, 17, 3 and 33 at 8 am-12 pm; the terminal users are mainly centralized in cells 30, 17, 3 and 33 at 12 pm-8 pm; and the terminal users gradually move to cells 18, 20, 7 and 28 at 8 am-12 am.

Figure 6:
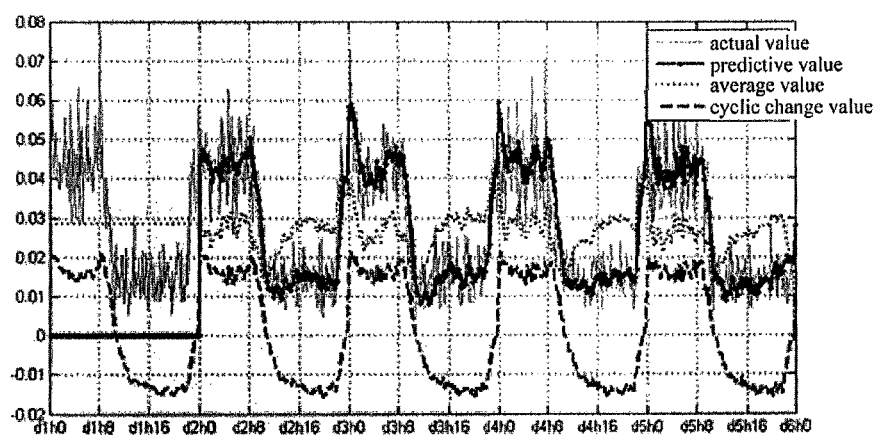
FIG. 6 is a schematic diagram of contrast between parameters predicted by using a Holt-Winters method and actual measurement values provided by embodiment 2 of the present invention.

In the present invention, the traffic distribution of the next cycle is predicted in the Holt-Winters method, and contrast between predictive values and actual values is obtained as shown in FIG. 6, wherein the light solid line expresses the actual values of the traffic distribution, and the dark solid line expresses the predictive values of the traffic distribution. It can be seen that a distribution rule obtained through prediction is accordant with a distribution rule of the actual values. The dotted line expresses a part of an average value of the traffic in the predicting process, and the dash line expresses a part of a cyclic change value of the traffic.

Figure 7:
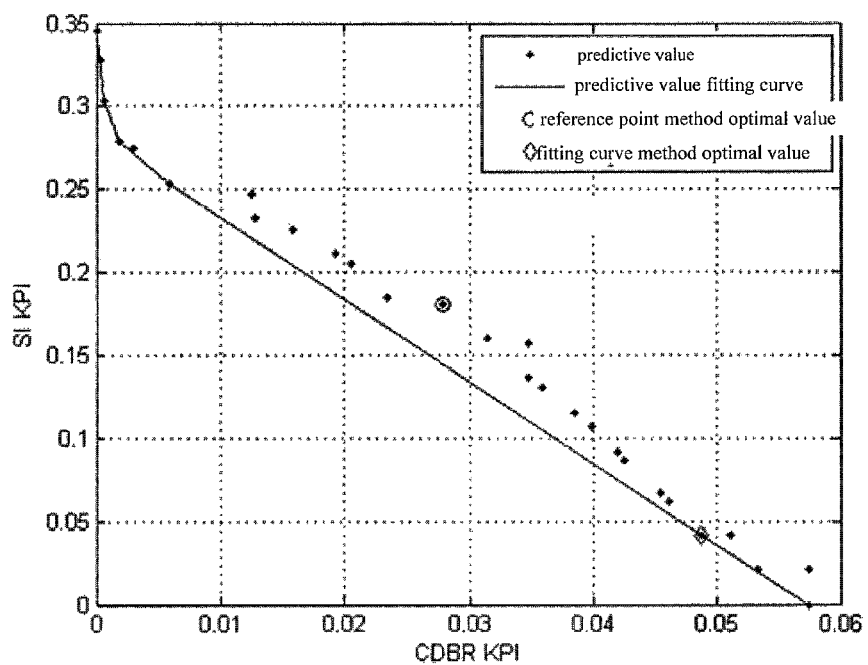
FIG. 7 is a schematic diagram of determining an optimal frequency spectrum allocation scheme according to expected values of network performance indicators provided by embodiment 2 of the present invention.

The result of the optimal solution determined using the Pareto Front generated by the present invention and the reference point method of the present invention, namely formula (13) together is shown in FIG. 7, wherein the discrete diamonds are the predictive values of the network performance indicators calculated in the frequency spectrum allocation schemes in the Pareto Front set, and the diamond in the circle expresses the optimal frequency spectrum allocation scheme obtained according to the reference point method.

Figure 8:
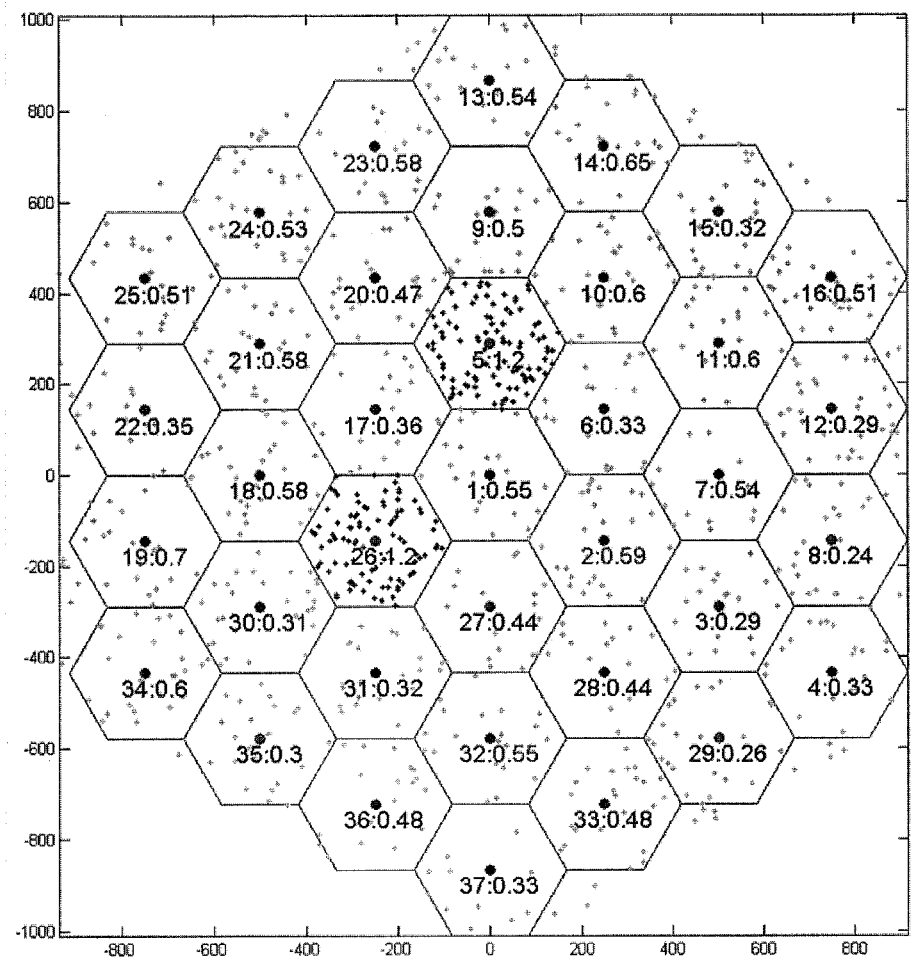
FIG. 8 is a schematic diagram of a network state corresponding to an optimal frequency spectrum allocation scheme provided by embodiment 2 of the present invention.

A network state schematic program obtained by performing allocation using the optimal frequency spectrum allocation scheme is shown in FIG. 8, from which it can be seen that the loads of the heavy-load cells 5 and 26 have decreased.

The method of the embodiment of the present invention, by determining whether the current frequency spectrum allocation scheme is suitable for the traffic distribution of the terminals to determine whether it is needed to perform a frequency spectrum reallocation process, and when it is determined that the current frequency spectrum allocation scheme is not suitable for the traffic distribution of the terminals, predicting the traffic distribution of the terminals and generating the multiple frequency spectrum allocation schemes, performs a dynamic frequency spectrum management process, and improves the utilization rate of the frequency spectrum; and by selecting a set of the multiple frequency spectrum allocation schemes superior to the current frequency spectrum allocation scheme using the genetic algorithm according to multiple network performance indicators at the same time, and selecting the optimal frequency spectrum allocation scheme from the set according to the expected values of the network performance indicators, achieves an objective of optimizing the multiple network performance indicators at the same time.

Embodiment 3

Figure 9:
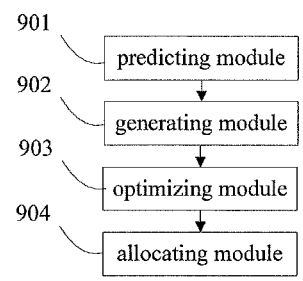
FIG. 9 is a schematic diagram of a structure of a device for dynamic frequency spectrum optimization provided by embodiment 3 of the present invention.

As shown in FIG. 9, an embodiment of the present invention provides a device for dynamic frequency spectrum optimization, and the device includes:
a predicting module 901, configured to predict a traffic distribution of terminal(s) in each cell of multiple cells;
a generating module 902, configured to generate multiple frequency spectrum allocation schemes for the multiple cells according to the traffic distribution of the terminal(s) in each cell, wherein each frequency spectrum allocation scheme comprises frequency spectrum(s) allocated for each cell;
an optimizing module 903, configured to select a frequency spectrum allocation scheme superior to a current frequency spectrum allocation scheme of the multiple cells from the multiple frequency spectrum allocation schemes according to at least two network performance indicators of a network in which the multiple cells are located; and
an allocating module 904, configured to allocate frequency spectrum(s) for the multiple cells using the selected frequency spectrum allocation scheme.

Figure 10:
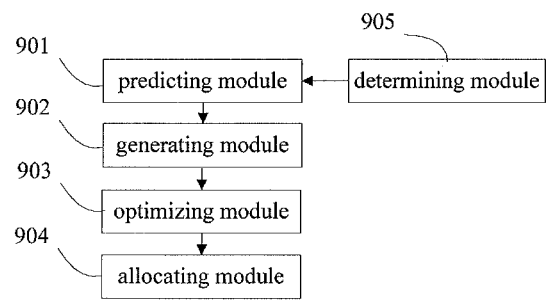
FIG. 10 is a schematic diagram of a structure of a device for dynamic frequency spectrum optimization including a determining module provided by embodiment 3 of the present invention.

As shown in FIG. 10, the device further includes a determining module 905, configured to determine whether the current frequency spectrum allocation scheme is suitable for a traffic distribution of terminal(s), and predict the traffic distribution of the terminal(s) in the condition that the current frequency spectrum allocation scheme is not suitable for the traffic distribution of the terminal(s) to generate a frequency spectrum allocation scheme set of a next cycle.

Figure 11:
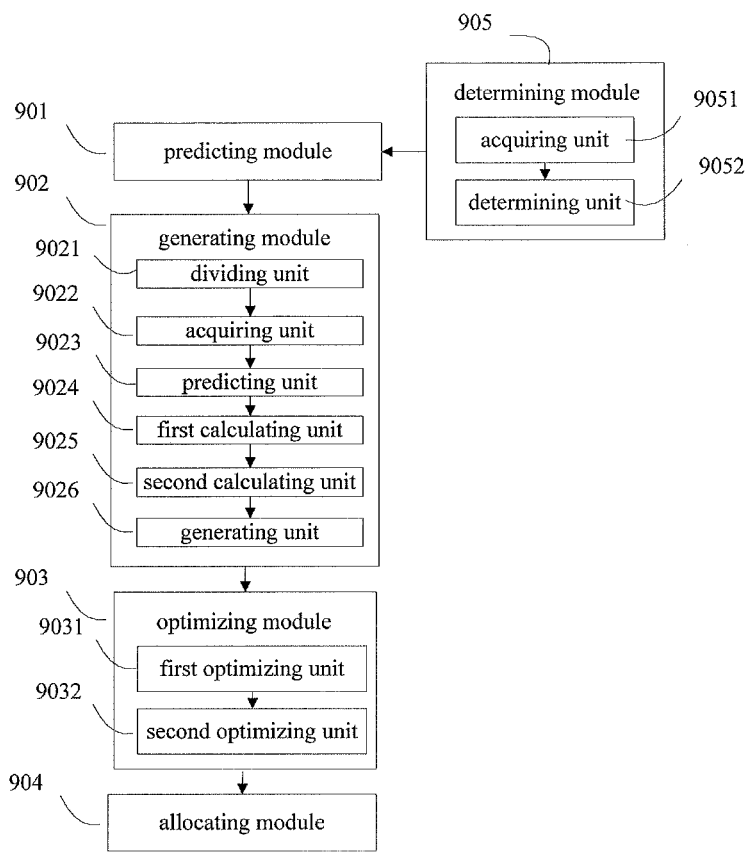
FIG. 11 is a schematic diagram of a specific structure of a device for dynamic frequency spectrum optimization provided by embodiment 3 of the present invention.

As shown in FIG. 11, the determining module 905 further includes:
an acquiring unit 9051, configured to acquire an average frequency spectrum efficiency and an average load of the network in real time;
the module performs measuring and calculating to obtain the real-time average load or average frequency spectrum efficiency according to a parameter configuration in the network side in the current frequency spectrum allocation scheme;
and a determining unit 9052, configured to determine that the current frequency spectrum allocation scheme of the multiple cells is not suitable for the traffic distribution of the terminal(s), if it is determined, according to the average frequency spectrum efficiency of the network in which the multiple cells are located acquired by the acquiring unit 9051, that the average frequency spectrum efficiency is smaller than a preset frequency spectrum efficiency threshold; or
to determine that the current frequency spectrum allocation scheme of the multiple cells is not suitable for the traffic distribution of the terminal(s), if it is determined, according to the average load of the network in which the multiple cells are located acquired by the acquiring unit 9051, that the average load is bigger than a preset load threshold.

In the present embodiment, the generating module 902 is configured to predict a predictive load of each cell according to the traffic distribution of the terminal(s) in each cell respectively, and allocating frequency spectrum(s) for the multiple cells according to the predictive load of each cell to obtain the multiple frequency spectrum allocation schemes. As shown in FIG. 11, the generating module 902 further includes:
a dividing unit 9021, configured to divide each cell of the multiple cells into at least one pixel;
an acquiring unit 9022, configured to acquire a current traffic of terminal(s) in each pixel of each cell;
a predicting unit 9023, configured to predict for each cell, a traffic distribution of the terminal(s) in each pixel according to the current traffic of the terminal(s) in each pixel of each cell;
a first calculating unit 9024, configured to calculate, for each cell, a predictive load parameter, a predictive noise interference parameter and a predictive propagation attenuation parameter of the cell according to the predicted traffic distribution of the terminal(s) in each pixel;
a second calculating unit 9025, configured to calculate the predictive load of each cell according to the predictive load parameter, the predictive noise interference parameter and the predictive propagation attenuation parameter of each cell; and
a generating unit 9026, configured to allocate the frequency spectrum(s) for the multiple cells according to the predictive load of each cell to generate the multiple frequency spectrum allocation schemes.

As shown in FIG. 11, the optimizing module 903 includes:
a first optimizing unit 9031, configured to select multiple frequency spectrum allocation schemes superior to the current frequency spectrum allocation scheme of the multiple cells from the multiple frequency spectrum allocation schemes using a genetic algorithm, according to the at least two network performance indicators of the network in which the multiple cells are located, to obtain a frequency spectrum allocation scheme set; and a second optimizing unit 9032, configured to select an optimal frequency spectrum allocation scheme from the frequency spectrum allocation scheme set according to expected values of the at least two network performance indicators.

The first optimizing unit is configured to determine whether a compromise relation exists between any two network performance indicators of the at least two network performance indicators of the network in which the multiple cells are located to obtain network performance indicators with the compromise relation;

to constitute a present generation by using each of the multiple frequency spectrum allocation schemes as an individual of the present generation;

when a preset cyclic condition is not satisfied, to repeatedly perform the following steps till the cyclic condition is satisfied:

to predict, for each individual in the present generation, values of the network performance indicators with the compromise relation when the individual is used;

to select, by a selector, elite individuals in the present generation according to the predicted values of the network performance indicators with the compromise relation when each individual is used;

to select multiple individuals in the present generation and perform crossover to the selected multiple individuals, by a crossover processor, to obtain crossover individuals;

to select multiple individuals in the present generation and perform random disturbance to the selected multiple individuals, by a mutation processor, to generate mutation individuals;

to constitute the elite individuals, the crossover individuals and the mutation individuals into a next generation, and enter a next cycle by taking the next generation as a present generation newly; and to take a current next generation obtained after cycles end as the frequency spectrum allocation scheme set.

The second optimizing unit is configured to take preset expected values of the at least two network performance indicators as a reference point, and for each frequency spectrum allocation scheme in the frequency spectrum allocation scheme set, predict predictive values of the at least two network performance indicators when the frequency spectrum allocation scheme is used;

to perform calculation in a reference point method to find out a frequency spectrum allocation scheme with the shortest distance between the predictive values of the network performance indicators and the expected values of the network performance indicators; and to select the frequency spectrum allocation scheme with the shortest distance as the optimal frequency spectrum allocation scheme.

The second optimizing unit is further configured to in the case of two network performance indicators, a frequency spectrum allocation scheme determined by a crossing point of a straight line which passes through the reference point and of which the slope is determined by weights of the network performance indicators, and the predictive values of the network performance indicators on a plane consisting of the predictive values of the two network performance indicators, wherein the weights of the network performance indicators are given values.

The device for dynamic frequency spectrum optimization provided by the embodiment of the present invention may be an entity for controlling multiple base stations in the network, such as a base station controller or a frequency spectrum management server. The network selects the optimal frequency spectrum allocation scheme through the device for dynamic frequency spectrum optimization to perform frequency spectrum allocation.

The device of the embodiment of the present invention, by acquiring the traffic distribution of the terminal(s) in each cell and generating the frequency spectrum allocation schemes, performs a dynamic frequency spectrum management process and improves the utilization rate of the frequency spectrum; and, by considering the multiple network performance indicators at the same time and selecting the optimal frequency spectrum allocation scheme according to the multiple network performance indicators, optimizes the multiple network performance indicators at the same time.

It shall be noted that, when the device for dynamic frequency spectrum optimization provided by the above-mentioned embodiment performs frequency spectrum management, it is only be illustrated by taking the division of the above-mentioned respective function module as an example, and in an actual application, the above-mentioned functions may be allocated to different function modules to be implemented according to a requirement, this is, the inner structure of the device is divided into different function modules to implement all of or a part of the functions described above. In addition, the device for dynamic frequency spectrum optimization provided by the above-mentioned embodiment belongs to the same concept with the embodiment of the method for dynamic frequency spectrum optimization, of which the specific implementing process is referred to the embodiment of the method, and will not be described redundantly herein.

Embodiment 4

Figure 12:
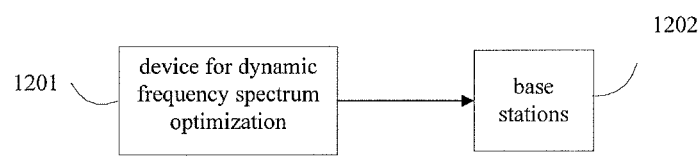
FIG. 12 is a schematic diagram of a structure of a system for dynamic frequency spectrum optimization provided by embodiment 4 of the present invention.

As shown in FIG. 12, an embodiment of the present invention provides a system for dynamic frequency spectrum optimization, and the system includes:

a device for dynamic frequency spectrum optimization 1201 and base stations 1202 to which multiple cells belong;

wherein the device for dynamic frequency spectrum optimization 1201 includes:

a predicting module, configured to predict a traffic distribution of terminal(s) in each cell of multiple cells;

a generating module, configured to generate multiple frequency spectrum allocation schemes for the multiple cells according to the traffic distribution of the terminal(s) in each cell, wherein each frequency spectrum allocation scheme comprises frequency spectrum(s) allocated for each cell;

an optimizing module, configured to select a frequency spectrum allocation scheme superior to a current frequency spectrum allocation scheme of the multiple cells from the multiple frequency spectrum allocation schemes according to at least two network performance indicators of a network in which the multiple cells are located; and an allocating module, configured to allocate frequency spectrum(s) for the multiple cells using the selected frequency spectrum allocation scheme.

The base stations 1202 are configured to receive frequency spectrum(s) allocated for the multiple cells by the device for dynamic frequency spectrum optimization.

Further, the device for dynamic frequency spectrum optimization 1201 includes a determining module, configured to determine whether the current frequency spectrum allocation scheme is suitable for a traffic distribution of terminal(s), and predict the traffic distribution of the terminal(s) in the condition that the current frequency spectrum allocation scheme is not suitable for the traffic distribution of the terminal(s) to generate a frequency spectrum allocation scheme set of a next cycle.

The device for dynamic frequency spectrum optimization 1201 has the same functions as the device in embodiment 3, and the structure and the function of each of the included predicting module, generating module, optimizing module, allocating module and determining module have been illustrated in details in embodiment 3, which are not described redundantly herein. The specific process for selecting the frequency spectrum allocation scheme by the device for dynamic frequency spectrum optimization 1201 may be referred to the methods used in embodiments 1 and 2.

For the base stations 1202 to which the multiple cells belong, it may be that one cell in the multiple cells corresponds to one base station, and it may also be that a few cells in the multiple cells correspond to one base station together. For example, when the multiple cells are 3 cells, it may be that cell 1, cell 2 and cell 3 correspond to base station 1, base station 2 and base station 3 respectively, and there are totally 3 base stations; and it may also be that cell 1 and cell 2 correspond to base station 1 together, cell 3 corresponds to base station 2, and there are totally 2 base stations. This example is merely used for illustration, and the embodiment of the present invention does not limit the corresponding relation between the cells and the base stations.

The system of the embodiment of the present invention, by predicting the traffic distribution of the terminal(s) in each cell and generating the multiple frequency spectrum allocation schemes through the device for dynamic frequency spectrum optimization, performs a dynamic frequency spectrum management process and improves the utilization rate of the frequency spectrum; and, by considering the multiple network performance indicators at the same time, selecting the optimized frequency spectrum allocation scheme according to the multiple network performance indicators, and allocating frequency spectrum(s) for the multiple cells, and receiving the frequency spectrum(s) allocated for the multiple cells through the base stations, realizes optimizing the multiple network performance indicators at the same time.

It should be appreciated for those of ordinary skill in the art that all of or a part of the steps in the above-mentioned embodiments may be implemented with hardware, and may also be implemented with a program instructing corresponding hardware. The program may be stored in a computer readable storage medium, and the above-mentioned storage medium may be a read-only memory, a magnetic disk, an optical disk, or the like.

The foregoing descriptions are merely preferred embodiments of the present invention, rather than limiting the present invention. Any modification, equivalent alteration, improvement or the like made within the spirit and principle of the present invention shall fall into the protection scope of the present invention.

What is claimed is:

1. A method for dynamic frequency spectrum optimization, comprising:
   predicting, by a device for dynamic frequency spectrum optimization, a traffic distribution of at least one terminal in each cell of multiple cells;
   generating, by the device, first multiple frequency spectrum allocation schemes for the multiple cells according to the traffic distribution of the at least one terminal in each cell, wherein each frequency spectrum allocation scheme comprises at least one frequency spectrum allocated for each cell;
   selecting, by the device, a frequency spectrum allocation scheme superior to a current frequency spectrum allocation scheme of the multiple cells from the first multiple frequency spectrum allocation schemes according to at least two network performance indicators of a network in which the multiple cells are located, including
   selecting second multiple frequency spectrum allocation schemes superior to the current frequency spectrum allocation scheme using a genetic algorithm, according to the at least two network performance indicators of the network in which the multiple cells are located, to obtain a frequency spectrum allocation scheme set; and
   selecting an optimal frequency spectrum allocation scheme from the frequency spectrum allocation scheme set according to expected values of the at least two network performance indicators; and
   allocating, by the device, at least one frequency spectrum for the multiple cells using the selected frequency spectrum allocation scheme.

2. The method of claim 1, before the predicting the traffic distribution of the at least one terminal in each cell of the multiple cells, further comprising:
   determining, by the device, whether the current frequency spectrum allocation scheme of the multiple cells is suitable for the traffic distribution of the at least one terminal;
   if the current frequency spectrum allocation scheme of the multiple cells is not suitable, executing the step of predicting the traffic distribution of the at least one terminal in each cell of the multiple cells.

3. The method of claim 2, wherein the determining whether the current frequency spectrum allocation scheme of the multiple cells is suitable for the traffic distribution of the at least one terminal comprises:
   acquiring an average frequency spectrum efficiency of the network in which the multiple cells are located, and determining that the current frequency spectrum allocation scheme of the multiple cells is not suitable for the traffic distribution of the at least one terminal if the average frequency spectrum efficiency is smaller than a preset frequency spectrum efficiency threshold.

4. The method of claim 2, wherein the determining whether the current frequency spectrum allocation scheme of the multiple cells is suitable for the traffic distribution of the at least one terminal comprises:
   acquiring an average load of the network in which the multiple cells are located, and determining that the current frequency spectrum allocation scheme of the multiple cells is not suitable for the traffic distribution of the at least one terminal if the average load is bigger than a preset load threshold.

5. The method of claim 1, wherein the generating multiple frequency spectrum allocation schemes for the multiple cells according to the traffic distribution of the at least one terminal in each cell comprises:
   predicting a predictive load of each cell according to the traffic distribution of the terminal in each cell respectively, and allocating the at least one frequency spectrum for the multiple cells according to the predictive load of each cell to obtain the first multiple frequency spectrum allocation schemes.

6. The method of claim 5, wherein the predicting the predictive load of each cell according to the traffic distribution of the at least one terminal in each cell, and the allocating the at least one frequency spectrum for the multiple cells according to the predictive load of each cell to obtain the multiple frequency spectrum allocation schemes comprise:
- dividing each cell of the multiple cells into at least one pixel;
- acquiring a current traffic of the at least one terminal in each pixel of each cell;
- predicting, for each cell, the traffic distribution of the at least one terminal in each pixel according to the current traffic of the at least one terminal in each pixel of each cell;
- calculating, for each cell, a predictive load parameter, a predictive noise interference parameter and a predictive propagation attenuation parameter of the cell according to the predicted traffic distribution of the at least one terminal in each pixel;
- calculating the predictive load of each cell according to the predictive load parameter, the predictive noise interference parameter and the predictive propagation attenuation parameter of each cell; and
- allocating the at least one frequency spectrum for the multiple cells according to the predictive load of each cell to generate the first multiple frequency spectrum allocation schemes.

7. The method of claim 1, wherein the selecting the second multiple frequency spectrum allocation schemes superior to the current frequency spectrum allocation scheme of the multiple cells from the first multiple frequency spectrum allocation schemes using the genetic algorithm, according to the at least two network performance indicators of the network in which the multiple cells are located, to obtain the frequency spectrum allocation scheme set comprises:
- determining whether a compromise relation exists between any two network performance indicators of the at least two network performance indicators of the network in which the multiple cells are located to obtain network performance indicators with the compromise relation;
- constituting a present generation by using each of the first multiple frequency spectrum allocation schemes as an individual of the present generation;
- when a preset cyclic condition is not satisfied, repeatedly performing the following steps until the cyclic condition is satisfied:
- predicting, for each individual in the present generation, values of the network performance indicators with the compromise relation when the individual is used;
- selecting, by a selector, elite individuals in the present generation according to the predicted values of the network performance indicators with the compromise relation when each individual is used;
- selecting multiple individuals in the present generation and performing crossover to the selected multiple individuals, by a crossover processor, to obtain crossover individuals;
- selecting multiple individuals in the present generation and performing random disturbance to the selected multiple individuals, by a mutation processor, to generate mutation individuals;
- constituting the elite individuals, the crossover individuals and the mutation individuals into a next generation, and entering a next cycle by taking the next generation as a newly present generation;
- taking a current next generation obtained after cycles end as the frequency spectrum allocation scheme set.

8. The method of claim 1, wherein the selecting the optimal frequency spectrum allocation scheme from the frequency spectrum allocation scheme set according to the expected values of the at least two network performance indicators comprises:
- taking preset expected values of the at least two network performance indicators as a reference point, and for each frequency spectrum allocation scheme in the frequency spectrum allocation scheme set, predicting predictive values of the at least two network performance indicators when the frequency spectrum allocation scheme is used;
- performing calculation in a reference point method to find out a frequency spectrum allocation scheme with a shortest distance between the predictive values of the network performance indicators and the expected values of the network performance indicators; and
- selecting the frequency spectrum allocation scheme with the shortest distance as the optimal frequency spectrum allocation scheme.

9. The method of claim 8, wherein the performing calculation in the reference point method to find out the frequency spectrum allocation scheme with the shortest distance between the predictive values of the network performance indicators and the expected values of the network performance indicators comprises:
- finding out, in the case of two network performance indicators, a frequency spectrum allocation scheme determined by a crossing point of a straight line which passes through the reference point and of which a slope is determined by weights of the network performance indicators, and the predictive values of the network performance indicators on a plane consisting of the predictive values of the two network performance indicators, wherein the weights of the network performance indicators are given values.

10. A device for dynamic frequency spectrum optimization, comprising a processor, and the following:
- a predicting module, configured to predict a traffic distribution of at least one terminal in each cell of multiple cells;
- a generating module, configured to generate first multiple frequency spectrum allocation schemes for the multiple cells according to the traffic distribution of the at least one terminal in each cell, wherein each frequency spectrum allocation scheme comprises at least one frequency spectrum allocated for each cell;
- an optimizing module, configured to select a frequency spectrum allocation scheme superior to a current frequency spectrum allocation scheme of the multiple cells from the first multiple frequency spectrum allocation schemes according to at least two network performance indicators of a network in which the multiple cells are located, wherein the optimizing module comprises:
- a first optimizing unit, configured to select second multiple frequency spectrum allocation schemes superior to the current frequency spectrum allocation scheme of the multiple cells from the first multiple frequency spectrum allocation schemes using a genetic algorithm, according to the at least two network performance indicators of the network in which the multiple cells are located, to obtain a frequency spectrum allocation scheme set; and
- a second optimizing unit, configured to select an optimal frequency spectrum allocation scheme from the frequency spectrum allocation scheme set according to expected values of the at least two network performance indicators; and an allocating module, configured to allocate the at least one frequency spectrum for the multiple cells using the selected frequency spectrum allocation scheme.

11. The device of claim 10, further comprising:
a determining module, configured to determine whether the current frequency spectrum allocation scheme of the multiple cells is suitable for a-traffic distribution of the at least one terminal;
wherein if not, the predicting module is configured to predict the traffic distribution of the at least one terminal in each cell of the multiple cells.

12. The device of claim 11, wherein the determining module comprises:
an acquiring unit, configured to acquire an average frequency spectrum efficiency of the network; and
a determining unit, configured to determine whether the average frequency spectrum efficiency is smaller than a preset frequency spectrum efficiency threshold, and to determine that the current frequency spectrum allocation scheme is not suitable for the traffic distribution of the at least one terminal if the average frequency spectrum efficiency is smaller than a preset frequency spectrum efficiency threshold.

13. The device of claim 11, wherein the determining module comprises:
an acquiring unit, configured to acquire an average load of the network; and
a determining unit, configured to determine whether the average load is bigger than a preset load threshold, and to determine that the current frequency spectrum allocation scheme is not suitable for the traffic distribution of the at least one terminal if the average load is bigger than a preset load threshold.

14. The device of claim 10, wherein the generating module is configured to predict a predictive load of each cell according to the traffic distribution of the at least one terminal in each cell respectively, and allocating the at least one frequency spectrum for the multiple cells according to the predictive load of each cell to obtain the first multiple frequency spectrum allocation schemes.

15. The device of claim 14, wherein the generation module further comprises:
a dividing unit, configured to divide each cell of the multiple cells into at least one pixel;
an acquiring unit, configured to acquire a current traffic of the at least one terminal in each pixel of each cell;
a predicting unit, configured to predict for each cell, the traffic distribution of the at least one terminal in each pixel according to the current traffic of the at least one terminal in each pixel of each cell;
a first calculating unit, configured to calculate, for each cell, a predictive load parameter, a predictive noise interference parameter and a predictive propagation attenuation parameter of the cell according to the predicted traffic distribution of the at least one terminal in each pixel;
a second calculating unit, configured to calculate the predictive load of each cell according to the predictive load parameter, the predictive noise interference parameter and the predictive propagation attenuation parameter of each cell; and
a generating unit, configured to allocate the at least one frequency spectrum for the multiple cells according to the predictive load of each cell to generate the first multiple frequency spectrum allocation schemes.

16. The device of claim 10, wherein the first optimizing unit is configured to determine whether a compromise relation exists between any two network performance indicators of the at least two network performance indicators of the network in which the multiple cells are located to obtain network performance indicators with the compromise relation;
to constitute a present generation by using each of the first multiple frequency spectrum allocation schemes as an individual of the present generation;
when a preset cyclic condition is not satisfied, to repeatedly perform the following steps until the cyclic condition is satisfied:
to predict, for each individual in the present generation, values of the network performance indicators with the compromise relation when the individual is used;
to select, by a selector, elite individuals in the present generation according to the predicted values of the network performance indicators with the compromise relation when each individual is used;
to select multiple individuals in the present generation and perform crossover to the selected multiple individuals, by a crossover processor, to obtain crossover individuals;
to select multiple individuals in the present generation and perform random disturbance to the selected multiple individuals, by a mutation processor, to generate mutation individuals;
to constitute the elite individuals, the crossover individuals and the mutation individuals into a next generation, and enter a next cycle by taking the next generation as a newly present generation; and
to take a current next generation obtained after cycles end as the frequency spectrum allocation scheme set.

17. The device of claim 10, wherein the second optimizing unit is configured to take preset expected values of the at least two network performance indicators as a reference point, and for each frequency spectrum allocation scheme in the frequency spectrum allocation scheme set, predict predictive values of the at least two network performance indicators when the frequency spectrum allocation scheme is used;
to perform calculation in a reference point method to find out a frequency spectrum allocation scheme with a shortest distance between the predictive values of the network performance indicators and the expected values of the network performance indicators; and
to select the frequency spectrum allocation scheme with the shortest distance as the optimal frequency spectrum allocation scheme.

18. The device of claim 17, wherein the second optimizing unit is further configured to find out, in the case of two network performance indicators, a frequency spectrum allocation scheme determined by a crossing point of a straight line which passes through the reference point and of which a slope is determined by weights of the network performance indicators, and the predictive values of the network performance indicators on a plane consisting of the predictive values of the two network performance indicators, wherein the weights of the network performance indicators are given values.

* * * * *